United States Patent Office 3,485,578
Patented Dec. 23, 1969

3,485,578
SODIUM SESQUICARBONATE-CONTAINING COMPOSITION AND ITS METHOD OF PREPARATION
Lawrence Peabody Gould, Syracuse, N.Y., assignor to Allied Chemical Corporation, New York, N.Y., a corporation of New York
No Drawing. Filed Apr. 4, 1967, Ser. No. 628,294
Int. Cl. C01d 7/14
U.S. Cl. 23—63    14 Claims

ABSTRACT OF THE DISCLOSURE

Converted sodium sesquicarbonate containing 4.0–14.5% by weight of water and having a bulk density of 25–42 pounds per cubic foot. The above product is produced under one method by heating sodium sesquicarbonate at a temperature above 100° C. for 1–60 minutes in a sealed vessel having an atmosphere containing carbon dioxide. The above product is also produced by passing sodium sesquicarbonate through a heated zone maintained at atmospheric pressure and above 300° C. and containing an atmosphere having at least 30% by volume of carbon dioxide.

---

This invention relates to the production of low density sodium sesquicarbonate and more particularly to a new and improved process for the production of low density sodium sesquicarbonate by a method in which part of the water of hydration is driven off in the presence of carbon dioxide.

It is desirable to have a sodium sesquicarbonate of a low bulk density of about 25–42 p.c.f. (pounds per cubic foot) for use in various applications, especially as a filler in detergent compositions. It is further, of course, desirable to produce such material as expeditiously and as economically as possible.

Sodium sesquicarbonate is more desirable than other soda ash compounds in that it is more free-flowing, stable, and results in aqueous solutions with a pH intermediate between aqueous solutions of sodium carbonate and sodium carbonate and sodium bicarbonate. Further it has a lower tendency to absorb water from the atmosphere than the other soda ash compounds. Prior art workers have tried to find a more free-flowing form of sodium sesquicarbonate having a lower bulk density but without satisfactory results.

It is one object of this invention to provide a new and improved process whereby sodium sesquicarbonate with a low bulk density may be produced.

It is another object of this invention to produce free-flowing sodium sesquicarbonate with a low bulk density.

It is a further object of this invention to produce free-flowing sodium sesquicarbonate with a low bulk density in which the size and shape of the sesquicarbonate crystals remain substantially the same.

It is an additional object of this invention to produce partially dehydrated sodium sesquicarbonate with a low bulk density by a process having low heat requirements.

Other objects and advantages of the present invention will be evident from the following description of the invention.

In accordance with the present invention, chalky-white acicular crystals of product sodium sesquicarbonate are produced having roughened surfaces in which crystals are comprised of a central core of ordinary sesquicarbonate and an outer layer comprised of Wegscheider's salt and free sodium carbonate or sodium bicarbonate and in which the crystals contain 4.0 to 14.5% by weight of water, said product having a bulk density of 25–42 p.c.f.

Under one process for making this product, sodium sesquicarbonate containing 2 moles of water per mole of said sesquicarbonate and having a bulk density of 43–65 p.c.f. is heated in a sealed enclosure under an initial pressure varying from 0 to 100 p.s.i. (pounds per square inch) above atmospheric pressure in an atmosphere containing carbon dioxide and at a temperature above 100° C. for a period of time varying from 5 to 60 minutes.

Under another process for making the product of this invention, sodium sesquicarbonate containing 2 moles of water per mole of said sesquicarbonate and having a bulk density of 43–65 p.c.f. is converted to low density sodium sesquicarbonate by passing it through an elongated zone in less than 60 seconds. The elongated zone is heated to a temperature of 300–1000° C. at atmospheric pressure in the presence of an atmosphere containing at least about 30% by volume of carbon dioxide.

Sodium sesquicarbonate which is heated will decompose according to the following reactions:

$$NaHCO_3 + Na_2CO_3 + 2H_2O \uparrow \quad (1)$$

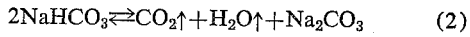

$$2NaHCO_3 \rightleftharpoons CO_2\uparrow + H_2O\uparrow + Na_2CO_3 \quad (2)$$

The presence of carbon dioxide in the atmosphere will retard the decomposition of sodium bicarbonate, and carbon dioxide may react with the sodium carbonate along with water vapor to form sodium bicarbonate according to the following reaction:

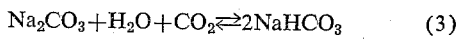

$$Na_2CO_3 + H_2O + CO_2 \rightleftharpoons 2NaHCO_3 \quad (3)$$

The sodium bicarbonate may react with sodium carbonate to form Wegscheider's salt according to the following reaction:

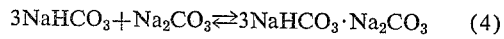

$$3NaHCO_3 + Na_2CO_3 \rightleftharpoons 3NaHCO_3 \cdot Na_2CO_3 \quad (4)$$

Thus, the presence of carbon dioxide acts to retard the decomposition of the free sodium bicarbonate and aids the formation of Wegscheider's salt. When employing the lower amounts of carbon dioxide in the atmosphere, then Wegscheider's salt and free sodium carbonate will be formed in the product from the sodium sesquicarbonate that is decomposed. When the larger or excess amounts of carbon dioxide are employed in the atmosphere, then Wegscheider's salt and free sodium bicarbonate will be formed from the sesquicarbonate that decomposes.

It should be noted that the present invention can be used with natural sesquicarbonate purified to 99.5% by weight as well as with synthetic sodium sesquicarbonate which is also of this purity. The sesquicarbonate is heated to above 100° C. generally within the range of 100–1000° C. and preferably within 110–700° C. For optimum efficiency the sesquicarbonate is heated above 110° C. since the vapor pressure of sodium sesquicarbonate is one atmosphere or 760 mm. of mercury at 109.6° C.

The temperature at which the sesquicarbonate is to be heated in accordance with the present invention depends on the heating time and to a lesser extent on the pressure used. Thus, if 5–60 minutes of heating time are allowed, the heating temperature will be usually in the range of 110–200° C. in order to evaporate sufficient water of hydration to substantially lower the bulk density. If the heating time allowed is from 0.2–60 seconds, then the sesquicarbonate particles must be passed through a zone whose walls are heated to about 300–1000° C. The shorter the time the particles will be in the heating zone the higher the temperature will have to be to evaporate a substantial portion of the water of hydration.

Generally the following ranges of temperature of heating versus time of heating can be applied:

| Time of heating: | Temperatures of heating, ° C. |
|---|---|
| Less than 1 minute | Above 300 |
| 1–5 minutes | 200–300 |
| 5–10 minutes | 150–200 |
| 10 minutes or more | 110–150 |

During the heating of the sesquicarbonate crystals it is important to have an atmosphere in which there is a substantial amount of carbon dioxide present. Preferably in the case where the sesquicarbonate is heated in a sealed enclosure there is initially present at least about 0.05% carbon dioxide by weight of the sodium sesquicarbonate present, more preferably at least about 0.3% by weight. However, it is important to note that when the reaction is carried out in a sealed enclosure, it can be carried out without any carbon dioxide present initially as in Example 8 in Table I.

In the sealed vessel embodiment of the present invention whether or not the reaction is carried out with additional carbon dioxide initially in the sealed vessel, the sesquicarbonate is heated until water vapor is evolved from the sesquicarbonate within said zone in amounts sufficient to develop a pressure attributable to water vapor of at least 10 p.s.i., preferably at least 15 p.s.i., above the initial vessel pressure over at least the major portion of the heating period. It will be evident to those skilled in the art when carrying out the invention in a sealed vessel, to select a reactor of suitable practical volume compared to the volume of the charged sesquicarbonate, usually a volumetric ratio of charged sesquicarbonate to total reactor volume between about 1 to 1.2 to 1 to 10 preferably between 1 to 1.5 to 1 to 5. The volume of the charged sesquicarbonate in the above ratios is based on the bulk density. It will also be evident that moist air or water vapor may be added to the reactor with or without added carbon dioxide for treating the charged material to produce products of varying desired composition.

The presence of an atmosphere containing 0.3% by weight of carbon dioxide based on the weight of sesquicarbonate will not only retard the decomposition of sodium bicarbonate in the sesquicarbonate but also a portion of the carbon dioxide will react with the free sodium carbonate that is formed to produce additional sodium bicarbonate which results in the formation of Wegscheider's salt. Thus, a portion of the additional carbon dioxide introduced into the reactor zone will be absorbed by the sesquicarbonate so that the amount of free carbon dioxide will be reduced. On the other hand, when additional free carbon dioxide is not introduced into the vessel, little carbon dioxide will evolve from the sesquicarbonate due to the pressure increase caused by the heating and the water vapor evolved from the sesquicarbonate. For this reason it is desirable to have an amount of carbon dioxide present which is at least 1.0% by weight of the sodium sesquicarbonate present.

In the case where the sesquicarbonate is passed through an open heating zone at atmospheric pressure, carbon dioxide should be passed continually into said zone so that the atmosphere in the zone will contain at least 30% by free space volume carbon dioxide to retard the decomposition of the free sodium bicarbonate. Furthermore, in order to convert the free soduim carbonate to sodium bicarbonate and thus promote the formation of Wegscheider's salt it is preferable to have an atmosphere containing 70-100% by volume carbon dioxide in the heating zone.

Under the first embodiment, the product of this invention is produced by heating sodium sesquicarbonate in a sealed enclosure above the initial pressure. The pressure retards the decomposition of the sodium sesquicarbonate and promotes the formation of Wegscheider's salt. Thus, when 300 grams of regular sodium sesquicarbonate was heated in the equipment used to obtain the data in Table I, at 120° C. for 10 minutes but entirely at atmospheric pressure without the presence of carbon dioxide the product was composed entirely of free sodium carbonate. When 300 grams of ordinary sodium sesquicarbonate was heated for 10 minutes at 132° C. at atmospheric pressure but in the presence of an atmosphere consisting of carbon dioxide, an anhydrous product containing sodium bicarbonate and sodium carbonate resulted. However, as noted from the data on Example 8 in Table I, if the reaction is carried out in a sealed vessel which is initially at atmospheric pressure so that pressure is allowed to build up with only air initially present in the atmosphere in the vessel and the sesquicarbonate is heated at 120° C. for 10 minutes, about 14 percent of the sesquicarbonate decomposes to form Wegscheider's salt and free sodium carbonate. The formation and retention of water and carbon dioxide vapor in the atmosphere as the sesquicarbonate decomposed also acted to retard the decomposition of the sesquicarbonate. Thus, if the vessel is sealed at atmospheric pressure, during the reaction, the pressure increase caused by the water vapor evolved from the sesquicarbonate will substantially retard the decomposition of the sesquicarbonate.

Under the first embodiment of this invention sodium sesquicarbonate having two moles of water per mole of sesquicarbonate and having a bulk density of about 43–65 p.c.f. is introduced into a pressurizable vessel or zone. Then carbon dioxide is introduced into the vessel so that there is generally 0.05 to 5.0% and preferably 0.3–2.0% by weight carbon dioxide based on the weight of sodium sesquicarbonate present in the vessel. In the presence of about 2.0% by weight or better of carbon dioxide the sesquicarbonate that decomposes will form Wegscheider's salt and free sodium bicarbonate as is seen from the data on Example 10 in Table I. If less than about 2.0% of carbon dioxide is added to the reaction mixture when Wegscheider's salt and free soda ash is formed.

For practical purposes the initial pressure on approaching operating temperatures in the vessel may range from 0–100 p.s.i. above atmospheric although much higher pressures can be used. As the initial pressure in the reaction vessel is increased the reaction temperature is preferably increased so that the decomposition of the sesquicarbonate does not proceed too slowly. Preferably enough carbon dioxide is added to the reaction mixture so that the initial pressure will vary from 10–80 p.s.i. above atmospheric. The vessel is sealed and heated by a rapid heat transfer means such as a burner or superheated steam so that the sodium sesquicarbonate in the vessel is maintained generally at about 100–200° C. and preferably at about 110–150° C. The heating is maintained for 1–60 minutes and preferably 5–30 minutes.

During the heating of the sesquicarbonate the vessel preferably is rotated or shaken so as to permit intimate contact between the carbon dioxide and sesquicarbonate and maintain the sesquicarbonate at a uniform temperature. The product is then taken out of the pressurized vessel, and the large pieces are broken up in a mill. The product sesquicarbonate containing generally about 4.0–14.5% water and preferably 4.0–12.0% water is stored for shipment. Furthermore, the bulk density is generally decreased by 10% and preferably by at least 30% to yield a product having a bullk density of generally 25–42 and preferably 25–35 p.c.f.

Under the second embodiment of the invention crystals of sodium sesquicarbonate having two moles of water per mole of sesquicarbonate are passed through a vertical cylinder or elongated zone which is heated externally by an electric furnace or any other means. The elongated zone may be formed by a cylinder generally 1–12 inches in diameter and above 6 inches in height, and preferably 2–6 inches in diameter and 2–10 feet in height. The cylinder may be constructed of any material that can withstand high temperatures such as silica or steel. The particles of sodium sesquicarbonate may be fed by a mechanical feeder to the top of the cylinder. A current of carbon dioxide is continually passed up through the cylinder so that an atmosphere of generally at least 30% by volume and preferably 70–100% by volume of carbon dioxide is maintained in the cylinder. The carbon dioxide passes up the cylinder in intimate contact with the sesquicarbonate particles falling down the cylinder. Generally the crystals of sodium sesquicarbonate will be in the heating zone less than 60 seconds and preferably 0.2–10 seconds.

The heating zone or cylinder is maintained at atmospheric pressure and generally within 300–1000° C. and preferably 400–700° C. during the process so that 0.25 to 1.5 moles of water of hydration are evaporated per mole of sesquicarbonate. By increasing and decreasing the temperature inside the cylinder the bulk density of the product particles may be varied. In every test run that was made the loss of water was found to be proportional to the temperature. The results of the test runs that were made using the second embodiment of the invention are listed in Table II.

In one case where the amount of water given off was 8.5% by weight of the original sesquicarbonate the bulk density was lowered by 18.5%. The density of the original sesquicarbonate which is generally 43–65 p.c.f. may be decreased by the above process by at least 10% and preferably by at least 30% to 25–42 and preferably 25–35 p.c.f. for different temperatures. The product sesquicarbonate may contain generally 4.0–14.5% water and preferably 4.0–12.0% water.

The crystals of the product of this invention are about the same size as that of the sesquicarbonate starting material as can be seen from the data below in Table I. An X-ray analysis of the product crystals indicated that they are basically composed of sodium sesquicarbonate and Wegscheider's salt. The product crystals are opaque and white with roughened outer surfaces. These crystals are composed of a core of ordinary sodium sesquicarbonate with Wegscheider's salt and free sodium carbonate or free sodium bicarbonate on the surface of the crystals as is seen from the data obtained by chemical analysis and calculations shown in Table I. In these examples the amount of ordinary sesquicarbonate in the product varies from 51.0% by weight in Example 4 which occurred when a temperature of heating of 150° C. and an initial pressure of 30 p.s.i. above atmospheric were used, to 86.1% by weight in Example 8 when the reaction was carried out at 120° C. and at an initial pressure of 0 p.s.i. above atmospheric. The amount of Wegscheider's salt varies from 9.4% in Example 8 to 37.7% in Example 4. Furthermore, the amount of free sodium carbonate varies from 0.4% in Examples 2 and 3 to 11.3% in Example 4. It was noticed in Example 10 where 2.0% by weight of carbon dioxide was used based on the weight of sodium sesquicarbonate that no free sodium carbonate was formed in the product crystals but instead 1.3% by weight of free sodium bicarbonate was formed.

The product produced by the present invention is dry and free-flowing. Furthermore, as a consequence of the roughened surface of the crystals, the product is able to absorb various wetting agents such as isooctyl phenyl polyethoxy ethanol available under the trademark "Triton X–100" and remain dry and free-flowing. When ordinary sesquicarbonate is mixed with the same wetting agents in the same proportion, say 10% by weight of "Triton X–100," the resulting mass is not free-flowing and sticks to the walls of the container.

Another advantageous feature of the product produced by the process of the present invention is that the same remains basically a sesquicarbonate in that is contains substantial water of hydration despite the process treatment and change in density and surface characteristics.

The examples given below further illustrate the practice of the invention.

EXAMPLES 1–10

A 300 gram sample of sodium sesquicarbonate having a bulk density of 45.1 p.c.f. was placed in a one liter stainless steel bomb which was equipped with a pressure gauge, thermometer pocket, inlet and outlet valves. Carbon dioxide was added to the sesquicarbonate as Dry Ice or as carbon dioxide gas or as a mixture of carbon dioxide, gas and air. After closing the valves the bomb was mounted on the end of a rotating shaft and heated externally by gas burners. At the end of the heating time the pressure was immediately released. The bomb was opened, the contents were emptied, allowed to cool to room temperature, and analyzed by X-ray and chemical analyses.

Ten runs were made using varying amounts of carbon dioxide, varying times of heating, varying temperatures of heating, and varying initial pressures. Data on the products obtained by the above described process are given in Table I for the ten different runs. The composition by weight of the product is given in terms of percent $NaHCO_3$ percent $Na_2CO_3$, and percent $H_2O$ as obtained by chemical analysis. The actual composition by weight of the product is then given in terms of percent $NaHCO_3 \cdot Na_2CO_3 \cdot 2H_2O$ percent $3NaHCO_3 \cdot Na_2CO_3$, percent free $Na_2CO_3$ and percent free $NaHCO_3$ as obtained by X-ray analysis, chemical analysis, and calculations.

The time of heating given in Table I was measured from the moment heat was first applied to the reactor vessel to the time the heating was terminated.

TABLE I.—DENSITY AND COMPOSITION AFTER HEATING SODIUM SESQUICARBONATE UNDER PRESSURE WITH AGITATION

| | SFX [a] | 1 | 2 | 3 | 4 | 5 | 6 | 7 | 8 | 9 | 10 |
|---|---|---|---|---|---|---|---|---|---|---|---|
| SFX,[a] g | | 300 | 300 | 300 | 300 | 300 | 300 | 300 | 300 | 300 | 300 |
| $CO_2$, g | | 4.5 | 4.5 | 4.5 | 4.5 | 3.0 | 3.0 | 3.0 | 0 | [b] | 6.0 |
| Pressure Start, lbs | | 24 | 24 | 24 | 30 | 20 | 24 | 18 | 0 | 10 | 40 |
| Pressure Finish, lbs | | 22 | 20 | 38 | 70 | 30 | 28 | 25 | 20 | 32 | 28 |
| Temperature, °C | | 111 | 118 | 132 | 150 | 120 | 120 | 122 | 120 | 120 | 119 |
| Time, minutes | | 10 | 10 | 10 | 10 | 10 | 30 | 60 | 10 | 10 | 10 |
| Density, lbs./ft.[3] | 45.1 | 41.1 | 33.2 | 31.8 | 30.3 | 31.8 | 30.1 | 25.8 | 36.1 | 33.7 | 32.9 |
| Density, g.p.l | 725 | 660 | 532 | 510 | 484 | 510 | 482 | 416 | 580 | 540 | 512 |
| Percent $NaHCO_3$ [c] | 37.2 | 42.3 | 44.4 | 43.4 | 45.0 | 44.3 | 42.8 | 44.4 | 38.6 | 40.4 | 45.9 |
| Percent $Na_2CO_3$ [c] | 46.9 | 46.1 | 43.3 | 44.3 | 46.9 | 44.5 | 46.0 | 45.0 | 47.7 | 46.5 | 42.2 |
| Percent $H_2O$ [c] | 15.9 | 11.6 | 12.3 | 12.3 | 8.1 | 11.2 | 11.2 | 10.6 | 13.7 | 13.1 | 11.9 |
| Percent $NaHCO_3 \cdot Na_2CO_3 \cdot 2H_2O$ [d] | 100 | 73.0 | 77.4 | 77.4 | 51.0 | 70.5 | 70.5 | 66.7 | 86.1 | 82.4 | 75.0 |
| Percent $3NaHCO_3 \cdot Na_2CO_3$ [d] | | 21.6 | 22.2 | 22.2 | 37.7 | 25.7 | 23.6 | 27.9 | 9.4 | 13.9 | 23.7 |
| Percent free $Na_2CO_3$ [d] | | 5.4 | 0.4 | 0.4 | 11.3 | 3.8 | 5.9 | 5.4 | 4.5 | 3.7 | |
| Percent free $NaHCO_3$ [d] | | | | | | | | | | | 1.3 |
| Screen Test: | | | | | | | | | | | |
| +20 | 0.2 | 0.2 | 0.2 | 1.1 | 1.3 | 0.5 | 2.0 | 2.3 | 0.1 | 0.1 | 0.3 |
| −20+40 | 12.3 | 5.9 | 22.4 | 16.2 | 15.5 | 21.2 | 14.7 | 28.1 | 9.3 | 11.0 | 9.4 |
| −40+60 | 54.6 | 43.9 | 56.3 | 48.6 | 46.3 | 53.9 | 48.7 | 54.2 | 45.6 | 51.7 | 50.9 |
| −60+80 | 23.3 | 31.3 | 15.9 | 22.9 | 22.9 | 18.5 | 21.7 | 10.1 | 28.2 | 25.9 | 28.4 |
| −80+100 | 5.2 | 9.5 | 2.8 | 5.8 | 5.7 | 3.2 | 5.7 | 1.9 | 8.8 | 6.1 | 6.9 |
| −100+200 | 3.7 | 7.6 | 2.0 | 4.1 | 5.4 | 2.2 | 5.4 | 2.4 | 6.5 | 4.2 | 3.5 |
| −200 | 0.7 | 1.6 | 0.4 | 1.3 | 2.9 | 0.5 | 1.8 | 1.0 | 1.5 | 1.0 | 0.6 |
| Percent Friability | | 6.0 | 3.0 | 4.5 | 6.0 | 2.5 | 6.0 | 8.5 | 6.5 | 6.0 | 5.0 |

[a] "Snowflake" (Registered Trademark); sodium sesquicarbonate ($Na_2CO_3 \cdot NaHCO_3 \cdot 2H_2O$).
[b] The vessel was charged with 40% $CO_2$ gas at the beginning.
[c] Composition as obtained by chemical analysis.
[d] Actual composition as calculated.

EXAMPLES 11–13

Sodium sesquicarbonate having a bulk density of 42.9 p.c.f. was passed down through a vertical steel cylinder 2 inches in diameter and 3 feet long. The cylinder was heated externally by an electric furnace and a thermocouple registered the temperature of the steel cylinder. The lower end was connected to a balloon flask as a product collector and a mechanical feeder was mounted at the top of the cylinder. A current of 100% carbon dioxide was admitted to the balloon flask and from there up the cylinder. When the temperature inside the cylinder reached 360° C. and above sodium sesquicarbonate crystals were made to fall through the cylinder by the mechanical feeder which fed the sesquicarbonate to the top of the cylinder at about 5 pounds per hour. It took the crystals about 1 second to pass through the cylinder. The product crystals were then collected at the bottom of the cylinder and analyzed by X-ray analysis and chemical analysis. Data on the products obtained by the above described process are given in Table II for three test runs.

TABLE II.—DENSITY AND COMPOSITION AFTER HEATING SODIUM SESQUICARBONATE AT ATMOSPHERIC PRESSURE

| Example No. | 11 | 12 | 13 |
| --- | --- | --- | --- |
| Rate of feed of $Na_2CO_3 \cdot NaHCO_3 \cdot 2H_2O$, lbs/hr | 5 | 5 | 5 |
| Temperature, °C | 360–400 | 400–430 | 420–450 |
| Time, seconds | 1 | 1 | 1 |
| Density, lbs./ft.³ | 35.2 | 34.2 | 34.9 |
| Density, g.p.l. | 568 | 552 | 562 |
| Percent $Na_2CO_3$ [a] | 50.2 | 46.8 | 41.5 |
| Percent $NaHCO_3$ [a] | 41.5 | 45.8 | 52.0 |
| Percent $H_2O$ [a] | 8.3 | 7.4 | 6.5 |
| Percent $Na_2CO_3 \cdot NaHCO_3 \cdot 2H_2O$ [b] | 52.2 | 46.5 | 40.8 |
| Percent $3NaHCO_3 \cdot Na_2CO_3$ [b] | 31.6 | 40.5 | 52.3 |
| Percent free $Na_2CO_3$ [b] | 16.2 | 13.0 | 6.9 |

[a] Composition as obtained by chemical analysis.
[b] Actual composition as calculated.

1. A sodium sesquicarbonate product comprising acicular crystals having a central core of about 40 to 90% by weight of said crystals of sodium sesquicarbonate and a roughened, chalky-white outer layer comprised of the decomposition products of sodium sesquicarbonate consisting essentially of 10 to 50% by weight of said crystals of Wegscheider's salt, and up to about 20% by weight of said crystals of a member selected from the group consisting of sodium carbonate and sodium bicarbonate, said product being characterized as having a water of crystallization content of 4.0 to 14.5% by weight and a bulky density of 25 to 42 pounds per cubic foot.

2. The product of claim 1, characterized as having a water of crystallization content of 4 to 12% and a bulk density of 25 to 35 pounds per cubic foot.

3. A method for the treatment of sodium sesquicarbonate containing 2 mols of water per mol of sesquicarbonate and a bulk density of 43 to 65 pounds per cubic foot, which comprises heating said sodium sesquicarbonate in an enclosed zone at a temperature within the range of about 100° to 200° C. and under pressures of 10 to 100 pounds per square inch above atmospheric pressure for about 1 to 60 minutes in the presence of up to about 5% by weight carbon dioxide based on the weight of said sodium sesquicarbonate, and recovering a sodium sesquicarbonate product characterized by acicular crystals having a central core of about 40% to 90% by weight of said crystals of sodium sesquicarbonate and a roughened, chalky-white outer layer comprised of the decomposition products of said sodium sesquicarbonate consisting essentially of 10% to 50% by weight of said crystals of Wegscheider's salt and up to about 20% by weight of said crystals of a member selected from the group consisting of sodium carbonate and sodium bicarbonate, said sodium sesquicarbonate product being characterized as having a water of crystallization content of 4 to 14.5% and a bulk density of 25 to 42 pounds per cubic foot.

4. The method of claim 3 wherein the carbon dioxide is present within an amount to provide an initial atmosphere containing 0.3 to 2% by weight of carbon dioxide based on the weight of the sodium sesquicarbonate.

5. The method of claim 3 in which water vapor is evolved from said sesquicarbonate within said zone in amount sufficient to develop a water vapor partial pressure therein of at least 10 pounds per square inch due to the water vapor evolved over at least about the major portion of the heating period.

6. The method of claim 5 in which the volume of the charged sodium sesquicarbonate to the total reactor volume is between 1.0:1.2 to 1:10.

7. The method of claim 3 in which water vapor is evolved from the sodium sesquicarbonate within said zone in amounts sufficient to develop a water partial pressure therein of at least 15 pounds per square inch due to the water vapor evolved over at least about the major portion of the heating period.

8. The method of claim 3 in which said heating is maintained for 5 to 30 minutes and the sodium sesquicarbonate product is characterized by a water of crystallization content of 4 to 12% by weight and a bulk density of 25 to 35 pounds per cubic foot.

9. The method of claim 3 in which carbon dioxide is present within an amount to provide an initial atmosphere containing 0.05–5.0% by weight of carbon dioxide based on the weight of said sesquicarbonate.

10. The method of claim 3 which comprises heating said sesquicarbonate in said zone to within 110–150° C.

11. A method for the treatment of sodium sesquicarbonate containing 2 mols of water per mol of sesquicarbonate and a bulk density of 43 to 65 pounds per cubic foot, which comprises passing said sesquicarbonate through an elongated zone, contacting said sesquicarbonate with carbon dioxide passing counter-current to said sesquicarbonate in an amount sufficient to maintain in said zone at least about 30% by volume carbon dioxide, said contact between said sesquicarbonate and said carbon dioxide being less than 60 seconds, said zone being heated to a temperature from 300° C. to 1000° C. and recovering a sodium sesquicarbonate product characterized by acicular crystals having a central core of about 40% to 90% by weight of said crystals of sodium sesquicarbonate and a roughened, chalky-white outer layer comprised of the decomposition products of said sodium sesquicarbonate, consisting essentially of 10 to 50% by weight of said crystals of Wegscheider's salt and up to about 20% by weight of said crystals of sodium carbonate, said sodium sesquicarbonate product having a water of crystallization content of 4 to 14.5% and a bulk density of 25 to 42 pounds per cubic foot.

12. The method of claim 11 in which the carbon dioxide comprises 70–100% by volume.

13. The method of claim 11 in which the sodium sesquicarbonate is in contact with the carbon dioxide for 0.2 to 10 seconds.

14. The method of claim 11 in which the sodium sesquicarbonate is contacted with the carbon dioxide at temperatures from about 400° to 700° C.

References Cited

UNITED STATES PATENTS

| 1,583,661 | 5/1926 | Cocksedge | 23—64 |
| 2,948,967 | 8/1960 | Myers | 23—63 X |
| 3,188,170 | 6/1965 | Mantz | 23—63 |
| 3,235,329 | 2/1966 | Gancy | 23—63 |
| 3,336,105 | 8/1967 | Beck et al. | 23—63 |

OSCAR R. VERTIZ, Primary Examiner

G. T. OZAKI, Assistant Examiner

U.S. Cl. X.R.

23—64